United States Patent
Tomiyama

(10) Patent No.: US 10,047,844 B2
(45) Date of Patent: Aug. 14, 2018

(54) DYNAMIC DAMPER DEVICE

(71) Applicant: EXEDY Corporation, Neyagawa-shi, Osaka (JP)

(72) Inventor: Naoki Tomiyama, Neyagawa (JP)

(73) Assignee: EXEDY Corporation, Osaka (JP)

( * ) Notice: Subject to any disclaimer, the term of this patent is extended or adjusted under 35 U.S.C. 154(b) by 427 days.

(21) Appl. No.: 14/759,372

(22) PCT Filed: Feb. 24, 2014

(86) PCT No.: PCT/JP2014/054271
§ 371 (c)(1),
(2) Date: Jul. 6, 2015

(87) PCT Pub. No.: WO2014/132906
PCT Pub. Date: Sep. 4, 2014

(65) Prior Publication Data
US 2015/0345565 A1    Dec. 3, 2015

(30) Foreign Application Priority Data

Feb. 26, 2013 (JP) .................................. 2013-035371

(51) Int. Cl.
*F16F 15/129*   (2006.01)
*F16H 45/02*   (2006.01)
*F16F 15/14*   (2006.01)

(52) U.S. Cl.
CPC ........... *F16H 45/02* (2013.01); *F16F 15/129* (2013.01); *F16F 15/1421* (2013.01);
(Continued)

(58) Field of Classification Search
CPC ....... F16D 3/12; F16F 15/129; F16F 15/1292; F16F 15/1295; F16F 15/139;
(Continued)

(56) References Cited

U.S. PATENT DOCUMENTS 4,690,257 A * 9/1987 Suzuki ................... F16D 43/18
192/105 BA
5,014,834 A * 5/1991 Suzuki ................... F16D 43/18
192/105 BA
(Continued)

FOREIGN PATENT DOCUMENTS

CN          2601327 Y       1/2004
DE          2807165 A1      8/1978
(Continued)

OTHER PUBLICATIONS

Office Action of the corresponding Chinese Patent Application No. 201480007061.9, dated Aug. 29, 2016.
(Continued)

*Primary Examiner* — Josh Skroupa
(74) *Attorney, Agent, or Firm* — Global IP Counselors, LLP

(57) ABSTRACT

A dynamic damper device occupies a small space in an axial direction and can achieve a reduction in weight. The dynamic damper device is mounted to a turbine shell of a torque converter, and includes a damper plate, an inertia ring and a plurality of torsion springs. The damper plate is fixed to the turbine shell and is configured to be rotated. The inertia ring has spring accommodation parts and slider accommodation parts along a circumferential direction, and is disposed to be rotatable relative to the damper plate. The plurality of torsion springs are disposed in the spring accommodation parts of the inertia ring, and elastically couple the damper plate and the inertia ring in a rotational direction.

4 Claims, 10 Drawing Sheets

(52) U.S. Cl.
CPC ............... *F16H 2045/0205* (2013.01); *F16H 2045/0226* (2013.01); *F16H 2045/0294* (2013.01)

(58) Field of Classification Search
CPC ............... F16F 15/1392; F16F 15/1395; F16F 15/1421; F16H 45/02; F16H 2045/0205; F16H 2045/0226; F16H 2045/0294
USPC .......... 464/68.2, 68.4, 68.41; 192/3.28–3.31, 192/213.11, 213.22, 213.31, 214.1
See application file for complete search history.

(56) References Cited

U.S. PATENT DOCUMENTS

| | | | | |
|---|---|---|---|---|
| 8,240,442 B2* | 8/2012 | Nakamura | ............... | F16H 45/02 192/213.1 |
| 8,752,685 B2* | 6/2014 | Tomiyama | ............... | F16D 3/14 192/213 |
| 8,978,853 B2* | 3/2015 | Tomiyama | ............... | F16H 45/02 192/3.28 |
| 2011/0192692 A1* | 8/2011 | Werner | ............... | F16H 45/02 192/3.29 |
| 2012/0031722 A1* | 2/2012 | Takikawa | ............... | F16H 45/02 192/3.28 |
| 2013/0230385 A1* | 9/2013 | Lindemann | ............... | F16D 33/18 415/122.1 |

FOREIGN PATENT DOCUMENTS

| | | |
|---|---|---|
| DE | 102011017652 A1 | 10/2012 |
| GB | 2247299 A | 2/1992 |
| JP | 10-238589 A | 9/1998 |
| JP | 2005-249004 A | 9/2005 |
| JP | 2009041662 A * | 2/2009 |
| JP | 2009-293671 A | 12/2009 |
| JP | 2011-202782 A | 10/2011 |
| JP | 2012-057693 A | 3/2012 |
| JP | 2013-036587 A | 2/2013 |

OTHER PUBLICATIONS

2nd Office Action of the corresponding Chinese Patent Application No. 201480007061.9, dated Jan. 3, 2017.

* cited by examiner

<NORMAL CONDITION>

0 ~ SET ROTATIONAL SPEED

<ATTENUATED CONDITION>

SET ROTATIONAL SPEED ~ LOCKING ROTATIONAL SPEED

INCREASE IN HYSTERESIS TORQUE DECREASE IN TORSION ANGLE

<LOCKED CONDITION>

LOCKING ROTATIONAL SPEED

LOCKING OF D/D TORSION ANGLE: 0

DYNAMIC DAMPER DEVICE

CROSS-REFERENCE TO RELATED APPLICATIONS

This application is a U.S. National stage application of International Application No. PCT/JP2014/054271, filed Feb. 24, 2014, which claims priority to Japanese Patent Application No. 2013-035371, filed in Japan on Feb. 26, 2013, the entire contents of which are hereby incorporated by reference.

BACKGROUND

Field of Invention

The present invention relates to a dynamic damper device, particularly to a dynamic damper device mounted to an output-side member of a torque converter.

Background Information

A torque converter is equipped with a lock-up device to reduce fuel consumption. The lock-up device is disposed between a front cover and a turbine, and is configured to mechanically couple the front cover and the turbine to directly transmit a torque therebetween.

In general, the lock-up device includes a piston and a damper mechanism. The piston is pressed onto the front cover by the action of hydraulic pressure, and a torque is transmitted to the piston from the front cover. On the other hand, the damper mechanism includes a plurality of torsion springs, and the piston and an output-side member coupled to the turbine are elastically coupled by the plural torsion springs. In the lock-up device as described above, the torque transmitted to the piston is transmitted to the output-side member through the plural torsion springs, and is further transmitted to the turbine.

Incidentally, Japanese Laid-open Patent Application Publication No. 2009-293671 describes a lock-up device in which an inertia member is mounted to the output-side member to inhibit variation in engine rotation. In the lock-up device described in Japanese Laid-open Patent Application Publication No. 2009-293671, the inertia member is mounted to the output member fixed to the turbine to be rotatable relative thereto. Furthermore, torsion springs are mounted as elastic members between the output-side member and the inertia member.

In the lock-up device of Japanese Laid-open Patent Application Publication No. 2009-293671, the inertia member is coupled to the output member through the torsion springs. Therefore, the inertia member and the torsion springs function as a dynamic damper, and these components attenuate variation in rotational speed of the output-side member (turbine).

SUMMARY

In the lock-up device of Japanese Laid-open Patent Application Publication No. 2009-293671, the torsion springs, composing a part of the dynamic damper device, are disposed between the piston and the turbine, and as described above, an annular plate member is elastically coupled to the output member through the torsion springs. Furthermore, an inertia ring is fixed to the outer peripheral part of the annular plate.

The construction as described in Japanese Laid-open Patent Application Publication No. 2009-293671 results in an increase in axial space occupied by the dynamic damper, and also results in an increase in weight.

It is an object of the present invention to provide a dynamic damper device that especially occupies a small space in the axial direction and can achieve a reduction in weight.

A dynamic damper device according to an aspect of the present invention is a device mounted to an output-side member of a torque converter, and includes a rotary member, an inertia ring and a plurality of elastic members. The rotary member is fixed to the output-side member and is configured to be rotated. The inertia ring has accommodation parts along a circumferential direction and is disposed to be rotatable relative to the rotary member. The plural elastic members are disposed in the accommodation parts to elastically couple the rotary member and the inertia ring in a rotational direction.

In the present device, the rotary member and the inertia ring are elastically coupled by the plural elastic members, and a variation in rotational speed of the rotary member is inhibited by the inertia ring. The inertia ring has the accommodation parts, and the plural elastic members are disposed in the accommodation parts.

The plural elastic members are herein disposed and accommodated in the accommodation parts of the inertia ring. Hence, a space occupied by the dynamic damper device can be reduced in comparison with a well-known dynamic damper device. Furthermore, the torsion springs are enabled to serve a function of inertia. Hence, an increase in weight of the entire torque converter can be inhibited, and simultaneously, a variation in rotational speed can be effectively inhibited.

The dynamic damper device preferably includes a hysteresis torque generating mechanism that is disposed in the accommodation parts of the inertia ring and is configured to generate a first hysteresis torque in a low rotational speed range and generate a second hysteresis torque greater than the first hysteresis torque in middle to high rotational speed ranges.

Incidentally, recent passenger vehicles have been demanded to suppress as low as possible a rotational speed at which the front cover and the turbine are coupled (hereinafter referred to as "a lock-up rotational speed") to enhance efficiency in fuel consumption. However, in general, the engine rotational speed widely varies in a range that the engine rotational speed is low. Hence, when the lock-up rotational speed is set low, the output-side rotational speed inevitably varies more widely. In view of the above, with use of a lock-up device having an inertia member as described in Japanese Laid-open Patent Application Publication No. 2009-293671, a variation in rotation can be inhibited even when the lock-up rotational speed is set to be, for instance, roughly 1200 rpm.

However, a drawback is produced that the rotational speed widely varies at around 1600 rpm, for instance, where variation in output-side rotational speed is designed to be minimized at around 1200 rpm. The characteristic of variation in rotational speed, i.e., at around what rotational speeds variation in rotational speed is minimized and maximized, is mainly attributed to the magnitude of hysteresis torque to be generated between the output member and the inertia member.

The lock-up device described in Japanese Laid-open Patent Application Publication No. 2009-293671 is equipped with a hysteresis torque generating mechanism, but variation in output-side rotational speed cannot be inhibited over wide rotational speed ranges.

In view of the above, an aspect of the present invention is to increase frictional resistance between the rotary member and the inertia member, i.e., hysteresis torque, in accordance with increase in rotational speed. Therefore, a variation in rotational speed on the output side can be inhibited over wide rotational speed ranges. Consequently, with attachment of the dynamic damper device to the lock-up device, a variation in rotational speed can be inhibited over wide rotational speed ranges even when the lock-up rotational speed is set low.

The hysteresis torque generating mechanism is preferably configured to increase friction between the rotary member and the inertia ring in accordance with an increase in rotational speed to gradually reduce a relative torsion angle between the rotary member and the inertia ring.

In the present hysteresis torque generating mechanism, friction between the rotary member and the inertia ring, i.e., hysteresis torque, gradually increases in accordance with an increase in rotational speed, and accordingly, a relative torsion angle between the both members gradually decreases. Therefore, it is possible to inhibit occurrence of shock attributed to sharp variation in friction between both members and inhibit production of abnormal sound.

Preferably, the hysteresis torque generating mechanism includes a slider and a contact member. The slider is configured to be rotated together with the inertia ring, is radially movable with respect to the inertia ring, and has a slide surface extending in the rotational direction. The contact member is configured to be rotated together with the rotary member, and preferably, movement thereof is restricted as follows.

In the low rotational speed range, the contact member is configured to contact the slide surface of the slider such that a range of a torsion angle relative to the inertia ring is restricted to a first angular range.

In the middle rotational speed range, including a rotational speed higher than that in the low rotational speed range, the contact member is configured to contact the slide surface of the slider such that the range of the torsion angle relative to the inertia ring is restricted to a second angular range narrower than the first angular range.

In the high rotational speed range, including a rotational speed higher than that in the middle rotational speed range, the contact member is configured to make contact with the slide surface of the slider such that torsion relative to the inertia ring is prevented.

The slider preferably has a lock part to which the contact member is fitted and that is formed on a middle part of the slide surface in the rotational direction.

When the rotational speed reaches the high rotational speed range and the relative torsion angular range between the rotary member and the inertia ring is narrowed, the contact member is finally configured to be fitted to the lock part of the slider, and thus, relative rotation between the both members is prevented. Put differently, the hysteresis torque becomes infinite.

The accommodation parts of the inertia ring is preferably opened to one side in an axial direction.

The rotary member is preferably fixed at an inner peripheral part thereof to a turbine of the torque converter. Furthermore, the dynamic damper device preferably further includes a side plate that is fixed to a radially intermediate part of the rotary member and supports the inertia ring in a rotatable state.

According to the present invention as described above, the space occupied by the dynamic damper device can be reduced in the axial direction, and in addition, an increase in weight of the entire torque converter can be inhibited and simultaneously a variation in rotational speed can be effectively inhibited.

DESCRIPTION OF EXEMPLARY EMBODIMENTS

First Exemplary Embodiment

Entire Construction

Figure 1:
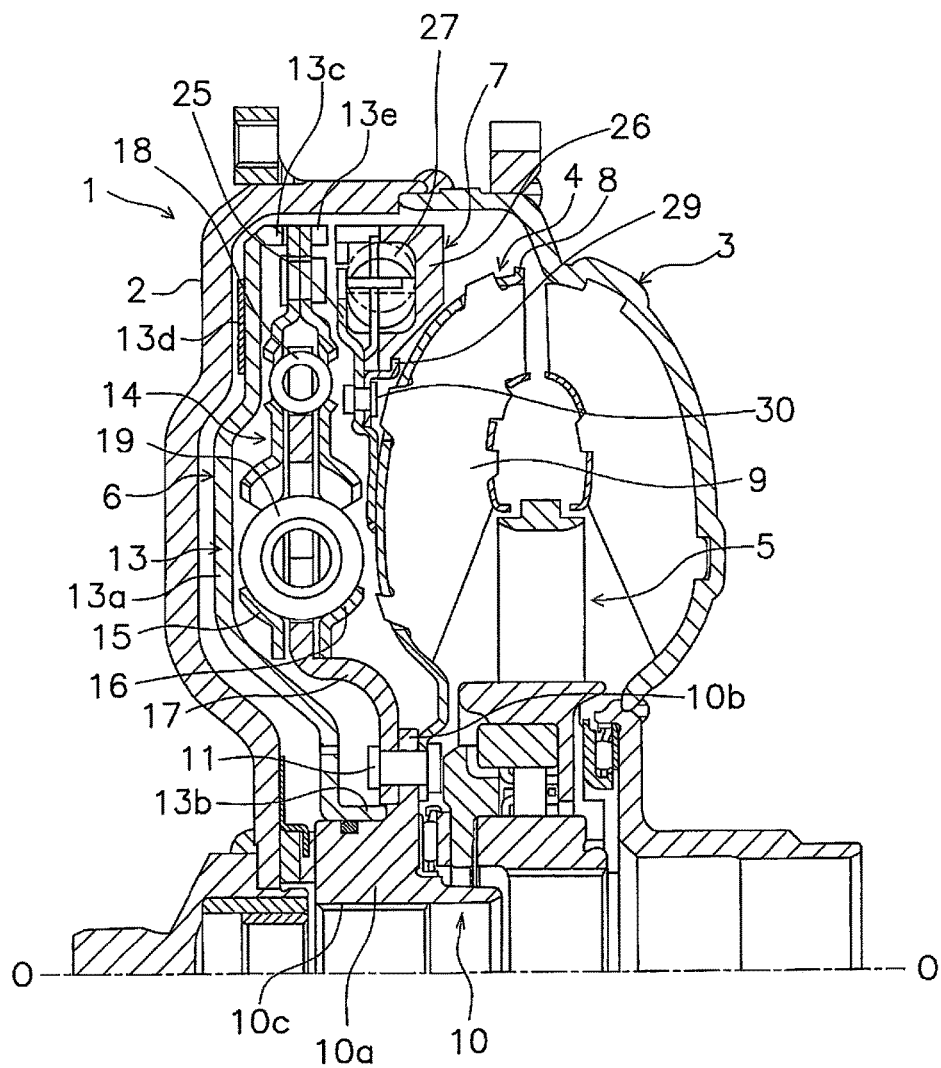
FIG. 1 is a cross-sectional view of a construction of a torque converter equipped with a dynamic damper device according to a first exemplary embodiment of the present invention.

FIG. 1 shows a torque converter according to an exemplary embodiment of the present invention. In FIG. 1, an engine is disposed on the left side, whereas a transmission is disposed on the right side. A line O-O depicted in FIG. 1 indicates a rotational axis of the torque converter.

A torque converter 1 is a device for transmitting a power from a crankshaft of the engine to an input shaft of the transmission, and mainly includes a front cover 2 to which the power is inputted, an impeller 3, a turbine 4, a stator 5, a lock-up device 6 and a dynamic damper device 7.

The outer peripheral part of the front cover 2 and that of the impeller 3 are welded to each other, and a fluid chamber is formed by the front cover 2 and the impeller 3. The turbine 4 is disposed within the fluid chamber to be opposed to the impeller 3. The turbine 4 includes a turbine shell 8, a plurality of turbine blades 9 fixed to the inside of the turbine shell 8, and a turbine hub 10 fixed to the inner peripheral part of the turbine shell 8. The turbine hub 10 has a tubular part 10a axially extending and a disc-shaped flange 10b extending radially outward from the tubular part 10a. Furthermore, the inner peripheral part of the turbine shell 8 is fixed to the outer peripheral part of the flange 10b by rivets 11. It should be noted that the turbine hub 10 has a spline hole 10c in the inner peripheral part thereof. Moreover, the input shaft of the transmission (not shown in the drawings) is coupled to the spline hole 10c. The stator 5 is a mechanism for regulating the flow of operating oil from the turbine 4 to the impeller 3, and is disposed between the inner peripheral part of the impeller 3 and that of the turbine 4.

Lock-Up Device 6

The lock-up device 6 is disposed between the front cover 2 and the turbine 4. The lock-up device 6 includes a piston 13 and a damper mechanism 14.

Piston 13

The piston 13 is an annular disc member, and has a disc part 13a, an inner peripheral tubular part 13b and an outer peripheral tubular part 13c. The disc part 13a is disposed in opposition to the front cover 2, and has a friction member 13d that is mounted to the outer peripheral part thereof to make frictional contact with the front cover 2. The inner peripheral tubular part 13b is disposed on the inner peripheral end of the disc part 13a so as to protrude toward the transmission. Furthermore, the inner peripheral tubular part 13b is supported by the outer peripheral surface of the tubular part 10a of the turbine hub 10 to be axially movable and rotatable relative thereto. The outer peripheral tubular part 13c is disposed on the outer peripheral end of the disc part 13a to protrude toward the transmission, and has a plurality of grooves 13e having a predetermined axial length.

Damper Mechanism 14

Figure 2:
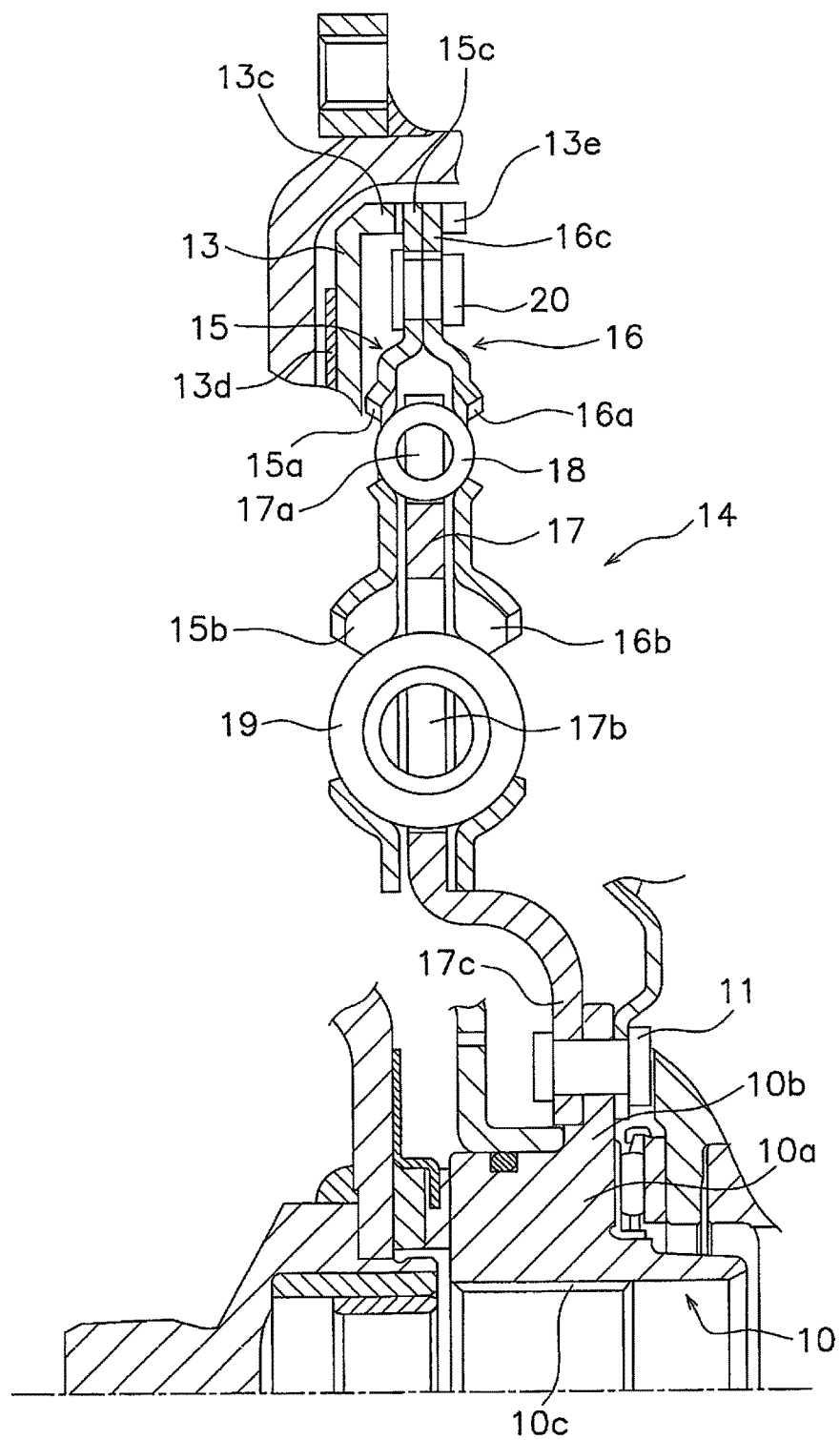
FIG. 2 is a diagram of a lock-up device extracted from FIG. 1.

FIG. 2 shows the damper mechanism 14 extracted from the entire construction. The damper mechanism 14 includes a pair of retaining plates 15 and 16, an output flange 17, a plurality of outer peripheral side torsion springs 18 and a plurality of inner peripheral side torsion springs 19.

The paired-off retaining plates 15 and 16 are annularly formed disc members, and are disposed so as to be axially opposed at an interval. Both of the retaining plates 15 and 16 have roughly the same shape, and each of them has a plurality of spring accommodation parts 15a, 16a located in the outer peripheral part thereof and a plurality of spring accommodation parts 15b, 16b located in the inner peripheral part thereof. Additionally, the outer peripheral parts of both plates 15 and 16 are fixed by rivets 20. Furthermore, each of the plates 15 and 16 has a plurality of teeth 15c, 16c on the outer peripheral end thereof, and the teeth 15c, 16c are engaged with the grooves 13e of the piston 13. With the construction, the damper mechanism 14 is configured to be non-rotatable relatively to the piston 13 and be axially movable.

The output flange 17 is disposed to be interposed between the paired-off retaining plates 15 and 16. The output flange 17 has cutouts 17a for spring accommodation in the outer peripheral part thereof, and has openings 17b for spring accommodation in the inner peripheral part thereof. An inner peripheral end 17c of the output flange 17 is fixed to the flange 10b of the turbine hub 10 by the rivets 11.

The outer peripheral side torsion springs 18 are disposed in the outer peripheral side cutouts 17a of the output flange 17, and are supported by the outer peripheral side spring accommodation parts 15a and 16a of the paired-off retaining plates 15 and 16. On the other hand, the inner peripheral side torsion springs 19 are disposed in the inner peripheral side openings 17b of the output flange 17, and are supported by the inner peripheral side spring accommodation parts 15b and 16b of the paired-off retaining plates 15 and 16.

Dynamic Damper Device 7

Figure 3:
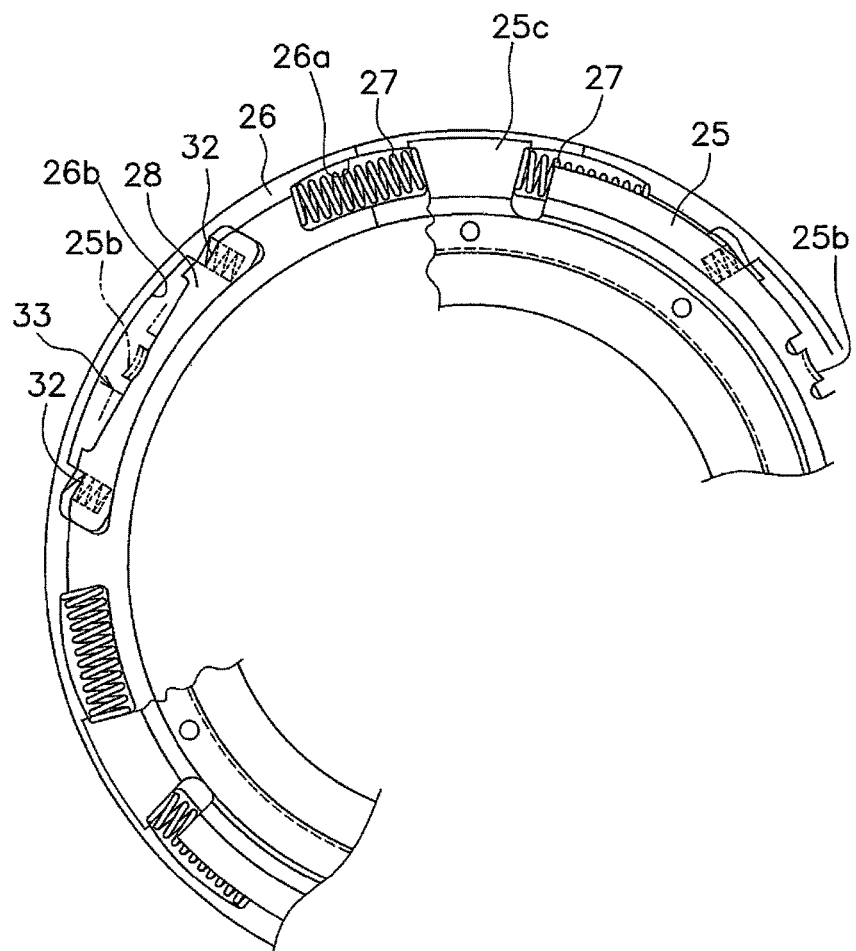
FIG. 3 is a front view of the dynamic damper device in FIG. 1.

As shown in FIGS. 1 and 3, the dynamic damper device 7 includes a damper plate 25 (a rotary member), an inertia ring 26, a plurality of torsion springs 27, a plurality of sliders 28, a side plate 29 and a plurality of springs 32. It should be noted that FIG. 3 is a front view of the dynamic damper device 7. Furthermore, a hysteresis torque generating mechanism 33 is composed of part of the damper plate 25, the plurality of sliders 28 and the plurality of springs 32, and detailed explanation thereof will be described below.

Figure 4:
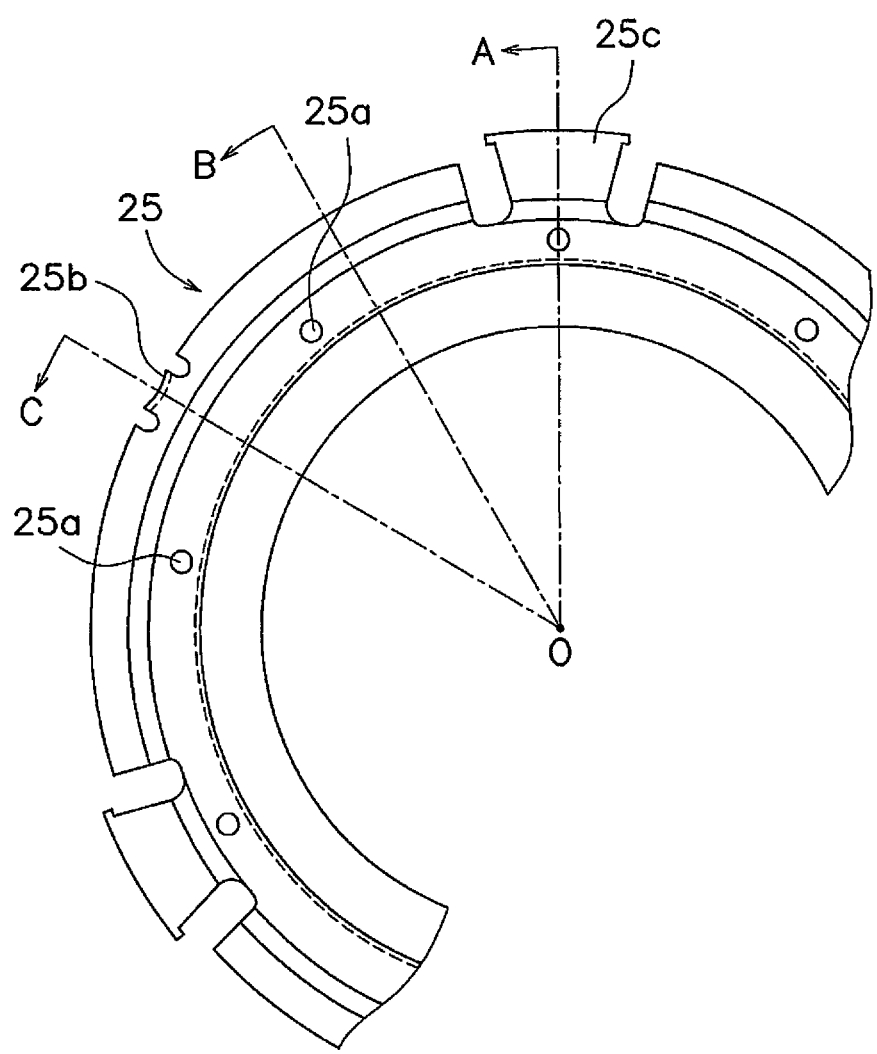
FIG. 4 is a front view of a damper plate composing a part of the dynamic damper device.
Figure 5C:
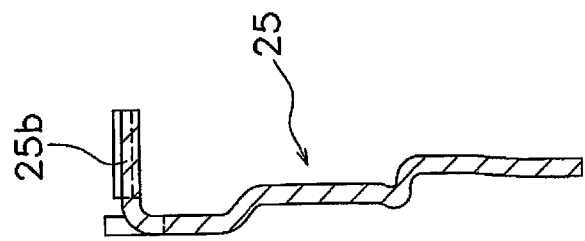
FIG. 5C is a cross-sectional view of the damper plate of FIG. 4 taken along line O-C.
Figure 5B:
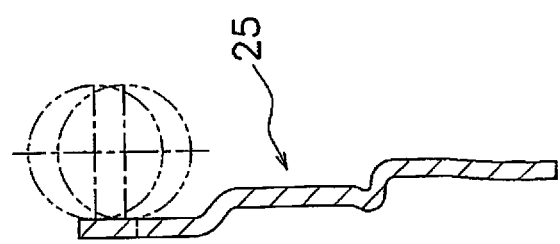
FIG. 5B is a cross-sectional view of the damper plate of FIG. 4 taken along line O-B.
Figure 5A:
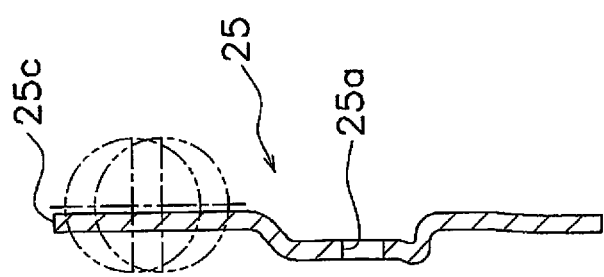
FIG. 5A is a cross-sectional view of the damper plate of FIG. 4 taken along line O-A.

FIG. 4 shows a partial front view of the damper plate 25. FIGS. 5A to 5C show cross-sections of the damper plate 25 of FIG. 4 respectively taken along lines O-A, O-B and O-C. The damper plate 25 is an annularly formed disc member, and as shown in FIG. 1, the inner peripheral end thereof is welded to the turbine shell 8. Furthermore, the damper plate 25 has a plurality of rivet holes 25a in the radially intermediate part thereof, and has a plurality of pawls 25b (contact members) and a plurality of engaging parts 25c on the outer peripheral end thereof. As shown in FIG. 5C, the pawls 25b are formed by bending the outer peripheral end of the damper plate 25 toward the transmission. As shown in FIG. 5A, the engaging parts 25c are formed to be axially displaced toward the transmission than the other part. The pawls 25b and the engaging parts 25c are circumferentially disposed in alternate arrangement.

Figure 6:
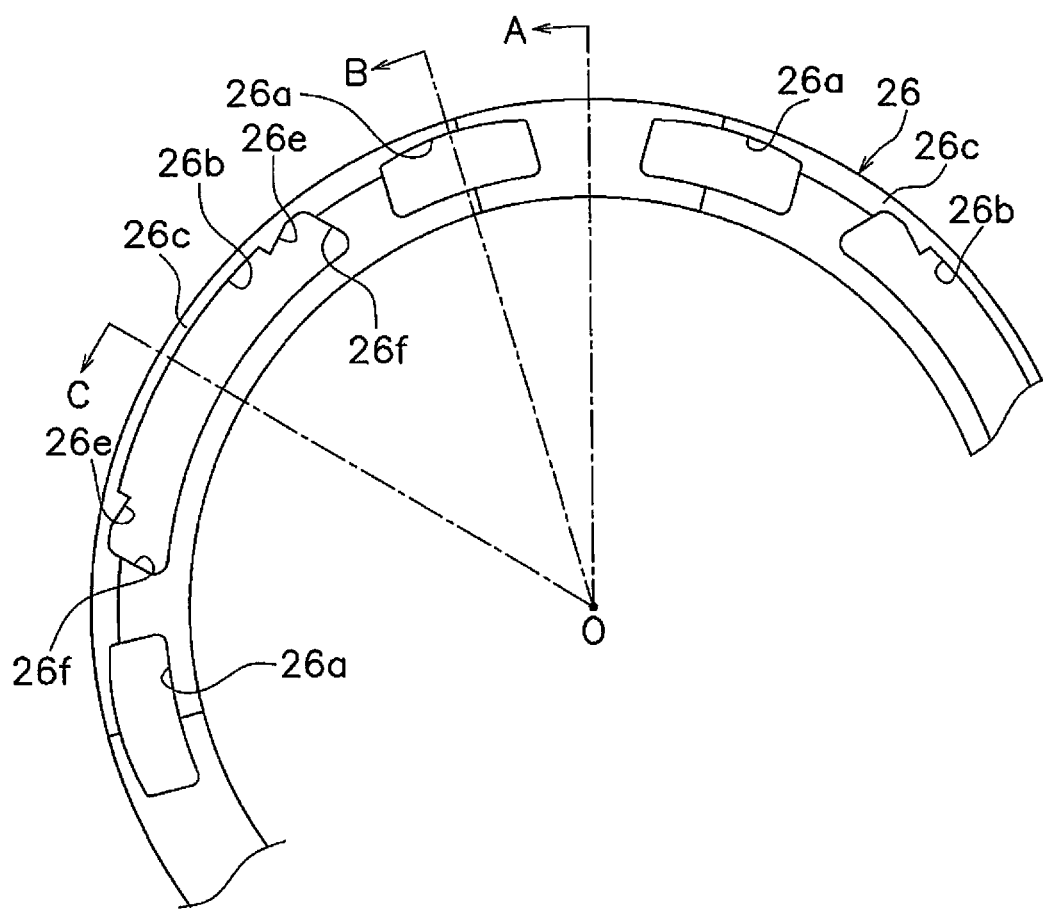
FIG. 6 is a front view of an inertia ring composing a part of the dynamic damper device.
Figure 7C:
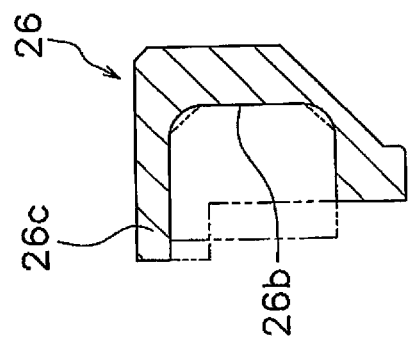
FIG. 7C is a cross-sectional view of the inertia ring of FIG. 6 taken along line O-C.
Figure 7B:
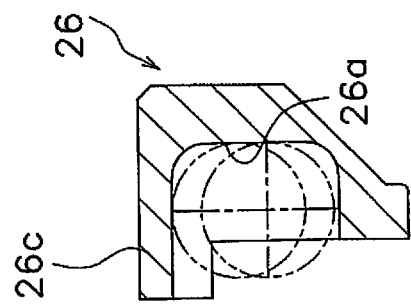
FIG. 7B is a cross-sectional view of the inertia ring of FIG. 6 taken along line O-B.
Figure 7A:
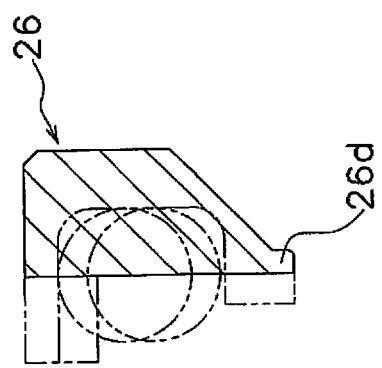
FIG. 7 is a cross-sectional view of the inertia ring of FIG. 6 taken along line O-A.

FIG. 6 shows a partial front view of the inertia ring 26. FIGS. 7A) to 7C show cross-sections of the inertia ring 26 of FIG. 6 respectively taken along lines O-A, O-B and O-C. The inertia ring 26 is disposed to be rotatable relatively to the damper plate 25.

The inertia ring 26 is an annular member, and has a plurality of spring accommodation parts (exemplary accommodation parts) 26a and a plurality of slider accommodation parts (exemplary accommodation parts) 26b, both types of which are circumferentially aligned at predetermined intervals. The respective accommodation parts 26a and 26b are recessed parts formed to be axially opened toward the engine and recessed toward the transmission. Each of the plural slider accommodation parts 26b is disposed to be circumferentially interposed between two of the spring accommodation parts 26a.

Moreover, a plurality of protruding parts 26c are formed on the outer peripheral end of the inertia ring 26 such that each continues over a region corresponding to one slider accommodation part 26b and part of two spring accommodation parts 26a adjacent to the slider accommodation part 26b. The protruding parts 26c protrude axially toward the engine. Furthermore, as shown in FIG. 7A, a restriction part 26d is formed on the inner peripheral end of the inertia ring 26 to protrude to the inner peripheral side. The side plate 29 makes contact with the restriction part 26d from the transmission side, and axial movement of the inertia ring 26 is thereby restricted. It should be noted that as shown in FIG. 1, the inner peripheral part of the side plate 29 is fixed to the damper plate 25 by rivets 30.

As shown in FIG. 3, the plurality of torsion springs 27 are accommodated in the spring accommodation parts 26a of the inertia ring 26. Additionally, ends of the torsion springs 27 are engaged with both ends of each engaging part 25c of the damper plate 25. This results in a construction that the damper plate 25 and the inertia ring 26 are elastically coupled in the rotational direction by the torsion springs 27.

Figure 8:
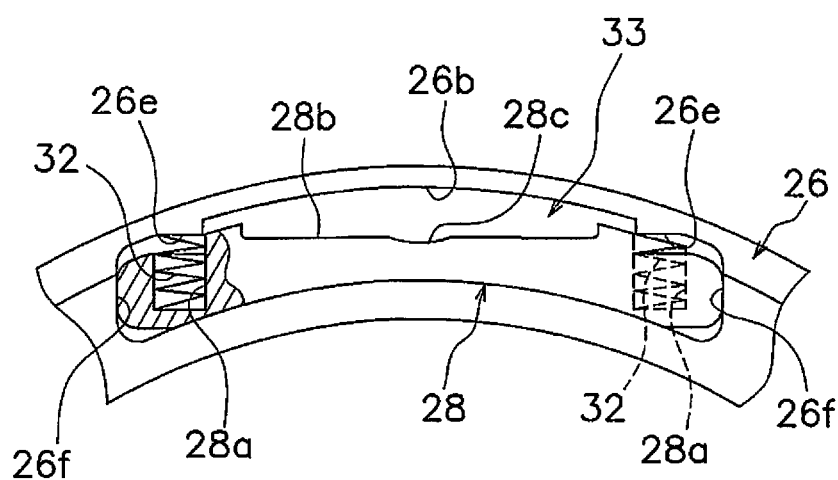
FIG. 8 is a partial enlarged view of the dynamic damper device of FIG. 3.

As shown in FIG. 3, the sliders 28 are circumferentially elongated members, and are accommodated in the slider accommodation parts 26b of the inertia ring 26 to be radially movable. FIG. 8 shows the slider accommodation part 26b of the inertia ring 26 and the slider 28, which are extracted from the entire construction.

The slider accommodation part 26b has spring receiving parts 26e on both circumferential ends thereof. Additionally, both circumferential end walls of the slider accommodation part 26b function as guide parts 26f.

The slider 28 has spring accommodation parts 28a that are formed radially inward in both circumferential ends thereof. Moreover, a spring 32 is accommodated in each spring accommodation part 28a to urge the slider 28 to the inner peripheral side. Both lengthwise ends of the slider 28 slidably contact the guide parts 26f of the slider accommodation part 26b. Furthermore, an outer peripheral surface 28b of the slider 28 curves to be recessed inward. Additionally, a lock part 28c, to which the pawl 25b of the damper plate 25 is fitted, is formed on the circumferentially middle part of the outer peripheral surface 28b.

With the aforementioned construction, the pawls 25b of the damper plate 25, the sliders 28 and the springs 32 compose the hysteresis torque generating mechanism 33 that is configured to generate a variable hysteresis torque between the damper plate 25 and the inertia ring 26. It should be noted that in the hysteresis torque generating mechanism 33, the inertia ring 26, the torsion springs 27, the sliders 28 and the springs 32 function as an inertia member.

Action

First, an action of the torque converter body will be briefly explained. During rotation of the front cover 2 and the impeller 3, the operating oil flows from the impeller 3 to the turbine 4, and a power is transmitted from the impeller 3 to the turbine 4 through the operating oil. The power, transmitted to the turbine 4, is transmitted to the input shaft (not shown in the drawings) of the transmission through the turbine hub 10.

When the rotational speed of the input shaft reaches a predetermined rotational speed, the lock-up device 6 is turned on, and a power is mechanically transmitted from the front cover 2 to the turbine hub 10 through the lock-up device 6. Specifically, when the piston 13 is moved toward the engine due to variation in hydraulic pressure and the friction member 13d of the piston 13 is pressed onto the front cover 2, the piston 13 is unitarily rotated with the front cover 2. The paired-off retaining plates 15 and 16 are engaged with the piston 13, and hence, the power transmitted to the piston 13 is transmitted to the output flange 17 through the paired-off retaining plates 15 and 16 and the outer peripheral side and inner peripheral side torsion springs 18 and 19, and is further transmitted to the turbine hub 10.

Action of Dynamic Damper Device

In the lock-up device 6, rotation is transmitted to the turbine hub 10. At this time, the inertia ring 26 is mounted to the turbine shell 8 through the damper plate 25 and the torsion springs 27, and thus, a variation in rotation of the engine can be effectively inhibited. In this regard, detailed explanation will be hereinafter described.

Figure 9:
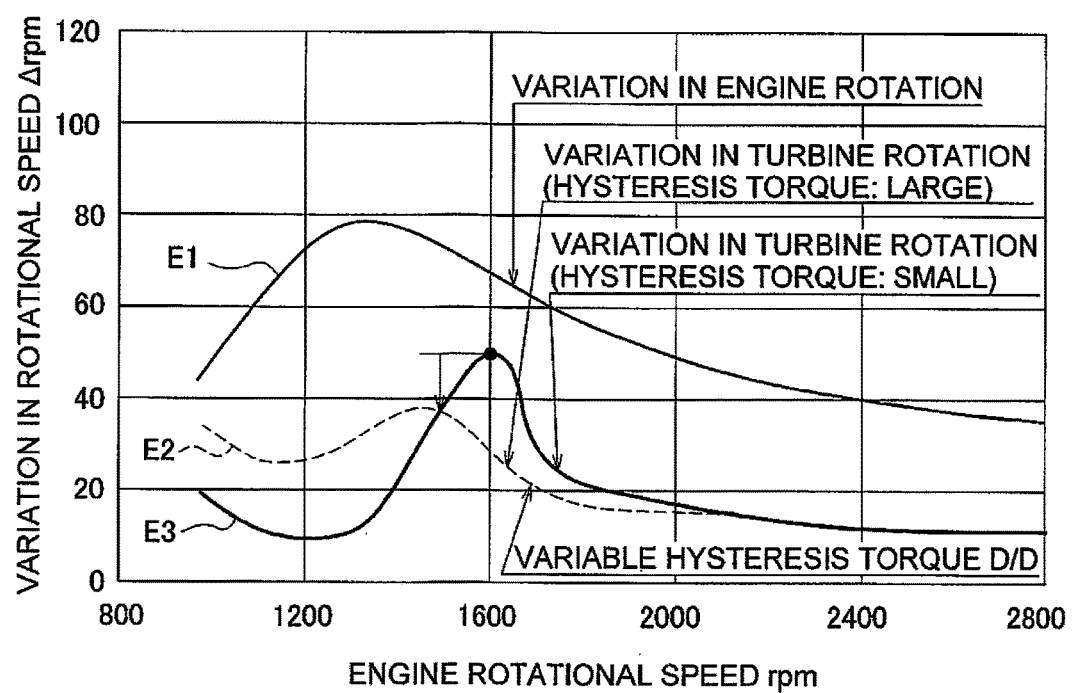
FIG. 9 is a characteristic diagram of engine rotational speed and variation in rotational speed.

As shown in FIG. 9, in general, when the engine rotational speed decreases, a variation in rotation of the engine to be caused by a variation in combustion increases (a characteristic E1). At this time, where the inertia ring 26 (i.e., the dynamic damper device7) is not provided, a variation in speed of rotation to be outputted from the torque converter gradually increases when the engine rotational speed decreases. By contrast, where the dynamic damper device 7 is provided as with the present exemplary embodiment, it is possible to reduce variation in rotational speed of the turbine as an output-side component at around a specific engine rotational speed (around 1200 rpm in the example of FIG. 9) (characteristics E2 and E3).

A difference between the characteristics E2 and E3 in a low rotational speed range is herein attributed to the magnitude of hysteresis torque in the hysteresis torque generating mechanism 33. Put differently, the characteristic E2 corresponds to a condition that the magnitude of hysteresis torque is relatively large, whereas the characteristic E3 corresponds to a condition that the magnitude of hysteresis torque is relatively small. In the characteristic E2, a variation in rotational speed of the turbine decreases when the engine is rotated at around a rotational speed lower than 1200 rpm, is then maximized at around 1500 rpm, and gradually decreases in a rotational speed range higher than around 1500 rpm. In the characteristic E3, a variation in rotational speed of the turbine indicates the minimum value smaller than that of the characteristic E2 around when the engine rotational speed exceeds 1200 rpm, and then, exceeds a variation in rotational speed in the characteristic E2 and indicates the maximum value when the engine rotational speed is around 1600 rpm.

As is obvious from these characteristics, in a low rotational speed range of the engine rotational speed, a variation in rotational speed of the turbine is smaller when the magnitude of hysteresis torque is smaller, whereas in a middle rotational speed range, a variation in rotational speed of the turbine is smaller when the magnitude of hysteresis torque is larger. In a high rotational speed range, a variation in rotational speed of the turbine is less affected by the magnitude of the hysteresis torque.

In view of the above, the hysteresis torque generating mechanism 33 according to the present exemplary embodiment is configured to make the hysteresis torque vary depending on the rotational speed ranges. Specifically, the magnitude of hysteresis torque to be generated by the hysteresis torque generating mechanism is small in the low rotational speed range of the engine rotational speed, and gradually increases in the middle and high rotational speed ranges.

Action of Hysteresis Torque Generating Mechanism

Figure 10A:
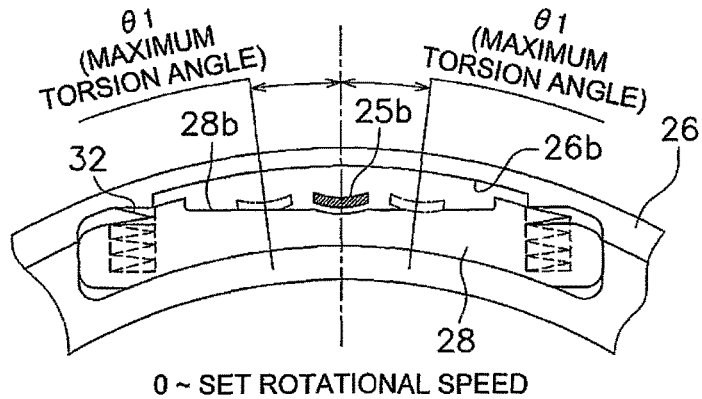
FIG. 10A is a diagram for explaining actions of a hysteresis torque generating mechanism in which a slider is in a normal condition.
Figure 10B:
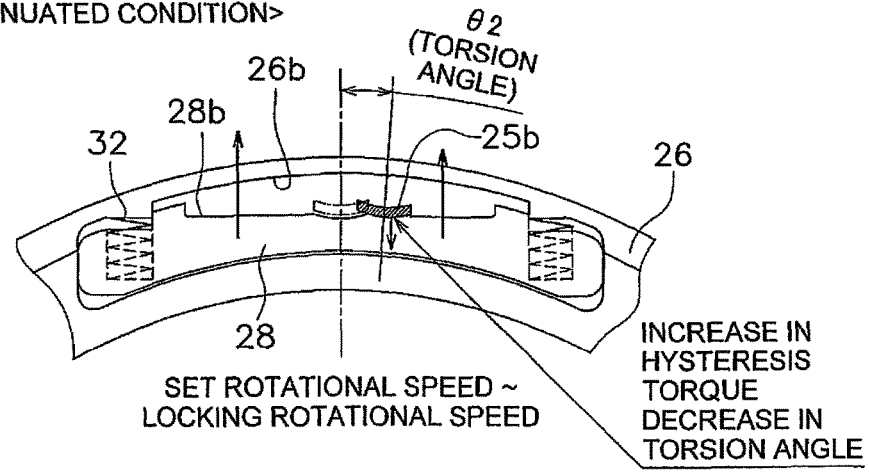
FIG. 10B is a diagram for explaining actions of a hysteresis torque generating mechanism in which a slider is in an attenuated condition.

Using FIG. 10, explanation will be described for an action whereby hysteresis torque varies in accordance with the rotational speed ranges.

First, the magnitude of centrifugal force acting on the sliders 28 is relatively small in the low rotational speed range. Therefore, as shown in <Normal Condition> of FIG. 10A, each slider 28 is urged to the inner peripheral side by the urging force of the springs 32. When the dynamic damper device 7 is actuated in such a condition and the damper plate 25 and the inertia ring 26 are rotated relative to each other, each pawl 25b of the damper plate 25 is moved relative to each slider 28 on the outer peripheral side of the outer peripheral surface 28b of each slider 28.

At this time, each pawl 25b makes contact with the outer peripheral surface 28b of each slider 28, and thereby, the angular range of relative rotation of the damper plate 25 (torsion angle) is restricted. Furthermore, the torsion angle is maximized to θ1 in the low rotational speed range shown in FIG. 10A. In a torsion angular range of ±θ1, each pawl 25b is smoothly moved outside each slider 28, and thus, the magnitude of hysteresis torque is herein small.

When the rotational speed increases, the magnitude of centrifugal force acting on the sliders 28 increases. When a large centrifugal force acts on each slider 28, each slider 28 is moved to the outer peripheral side against the urging force of the springs 32 as shown in <Attenuated Condition> of FIG. 10B. In such a condition, each pawl 25b and the outer peripheral surface 28b of each slider 28 get closer, and the range that each pawl 25b is smoothly movable (torsion angle) becomes θ2, which is narrower than that in the low rotational speed range of FIG. 10A. Furthermore, in a torsion angular range of θ2 or greater, each pawl 25b strongly makes contact with the outer peripheral surface 28b of each slider 28, and hence, a hysteresis torque larger than that in the low rotational speed range is generated.

Figure 10C:
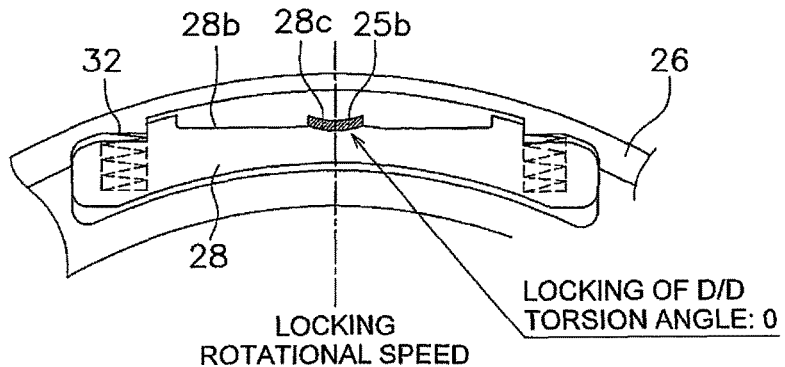
FIG. 10C is a diagram for explaining actions of a hysteresis torque generating mechanism in which a slider is in a locked condition.

When the rotational speed then further increases, each slider 28 is moved to the further outer peripheral side against the urging force of the springs 32, and a condition as shown in <Locked Condition> of FIG. 10C is produced. In the condition, each pawl 25b is fitted to the lock part 28c of the outer peripheral surface 28b of each slider 28. Relative rotation between the pawls 25b (i.e., the damper plate 25) and the inertia ring 26 is prevented, and a locked condition is produced. Thus, in the condition shown in FIG. 10C, the hysteresis torque in the dynamic damper device 7 becomes infinite.

In the construction as described above, as shown in FIG. 9, the characteristic of a variation in rotational speed of the turbine becomes the characteristic E3 in the low rotational speed range, and becomes the characteristic E2 in the middle to high rotational speed ranges. Therefore, a variation in rotational speed of the turbine can be inhibited low over the entire engine rotational speed ranges.

The torsion springs 27, the sliders 28 and the springs 32, composing the mechanism 33 for generating a variable hysteresis torque, are accommodated in the interior of the inertia ring 26. Hence, in particular, the space occupied by the dynamic damper device can be made compact in the axial direction. Furthermore, these members are enabled to serve a function of inertia, and the weight of the entire torque converter can be reduced.

A small hysteresis torque is generated in the low rotational speed range, whereas a larger hysteresis torque is generated in the middle to high rotational speed ranges. Thus, a variation in rotational speed of the turbine can be inhibited over wide rotational speed ranges.

The hysteresis torque is caused to vary with use of the centrifugal force acting on the sliders 28. Hence, with a simple construction, it is possible to generate a hysteresis torque, the magnitude of which depends on the rotational speed ranges.

The friction between the sliders 28 and the pawls 25b, i.e., the hysteresis torque, gradually increases with an increase in rotational speed, and thereby, the relative torsion angle between the both members gradually decreases. Therefore, it is possible to inhibit occurrence of shock due to sharp variation in friction between both members and production of abnormal sound.

The hysteresis torque of the dynamic damper device 7 is made infinite by causing the pawls 25b to be fitted to the lock parts 28c formed on the sliders 28. Thus, a large hysteresis torque can be generated with a simple mechanism.

Other Exemplary Embodiments

The present invention is not limited to the aforementioned exemplary embodiment, and a variety of changes or modifications can be herein made without departing from the scope of the present invention.

In the lock-up device 6 of the aforementioned exemplary embodiment, the torsion springs 18 and 19 are mounted to the inner and outer peripheral side parts of the lock-up device 6. However, torsion springs may be mounted to only the outer peripheral side part. In the construction, the axial dimension of the device can be further reduced.

In the aforementioned exemplary embodiment, the outer peripheral surface 28b of each slider 28 is made in the form of a surface curving radially inward. However, the outer peripheral surface may be made in the form of a flat surface.

According to the dynamic damper device of the present invention, its occupied space can be reduced in the axial direction, and in addition, an increase in weight of the entire torque converter can be inhibited and simultaneously variation in rotational speed can be effectively inhibited.

The invention claimed is:

1. A torque converter, comprising:
an input-side member;
an output-side member;
a lock-up device disposed between the input-side member and the output-side member, the lock-up device being configured to transmit torque from the input-side member to the output-side member, the lock-up device being directly connected to the output-side member; and
a dynamic damper device disposed between the lock-up device and the output-side member, the dynamic damper device being mounted to the output-side member, the dynamic damper device including
a rotary member fixed to the output-side member and configured to be rotated;
an inertia ring having a plurality of accommodation parts along a circumferential direction and disposed to be rotatable relative to the rotary member;
a plurality of elastic members being disposed in the plurality of accommodation parts to elastically couple the rotary member and the inertia ring in a rotational direction; and
a hysteresis torque generating mechanism disposed in the plurality of accommodation parts of the inertia ring and configured to generate a first hysteresis torque in a low rotational speed range and generate a second hysteresis torque greater than the first hysteresis torque in middle to high rotational speed ranges, the hysteresis torque generating mechanism being configured to increase friction between the rotary member and the inertia ring in accordance with an increase in a rotational speed to gradually reduce a relative torsion angle between the rotary member and the inertia ring, the hysteresis torque generating mechanism including
a slider configured to be rotated together with the inertia ring, to be radially movable with respect to the inertia ring, and to have a slide surface extending in the rotational direction, and
a contact member configured to be rotated together with the rotary member, configured to contact the slide surface of the slider such that a range of a torsion angle relative to the inertia ring is restricted to a first angular range in the low rotational speed range, configured to contact the slide surface of the slider such that the range of the torsion angle relative to the inertia ring is restricted to a second angular range narrower than the first angular range in the middle rotational speed range including a rotational speed higher than a rotational speed in the low rotational speed range, and configured to contact the slide surface of the slider such that a torsion relative to the inertia ring is prevented in the high rotational speed range including a rotational speed higher than the rotational speed in the middle rotational speed range.

2. The torque converter recited in claim 1, wherein the slider has a lock part to which the contact member is fitted, the lock part being formed on a middle part of the slide surface in the rotational direction.

3. The torque converter recited in claim 1, wherein each of the plurality of accommodation parts of the inertia ring is opened to one side in an axial direction.

4. The torque converter recited in claim 3, wherein the rotary member is fixed at an inner peripheral part thereof to the output-side member, and the dynamic damper device further comprises a side plate, the side plate being fixed to a radially intermediate part of the rotary member and supporting the inertia ring in a rotatable state.

* * * * *